Patented Aug. 7, 1923.

1,464,158

UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

PROCESS OF MAKING CELLULOSE ETHERS.

No Drawing.   Application filed April 5, 1921.   Serial No. 458,745.

*To all whom it may concern:*

Be it known that I, PAUL C. SEEL, a citizen of the United States of America, residing at Rochester, in the county of Monroe and State of New York, have invented certain new and useful Improvements in Processes of Making Cellulose Ethers, of which the following is a full, clear, and exact specification.

This invention relates to the manufacture of cellulose ethers. One object of the invention is to eliminate certain troublesome and expensive steps prior to the etherifying reaction. Other objects will hereinafter appear.

It has been proposed to form cellulose ethers by first obtaining an extremely intimate mixture of cellulose and alkali like caustic soda and then subjecting the mixture to an etherifying reagent under proper conditions. It has been suggested that the intimate mixture of the cellulose and alkali might be obtained by saturating the cellulose fibers with a strong solution of the alkali and then drying in a vacuum. My investigations indicate that this or similar preliminary treatments cause undesirable expense and trouble. The maintenance of the vacuum for long periods necessitates a considerable power expenditure, and if heat be employed to hasten the drying, care must be taken to avoid too high temperatures which might cause the cellulose to be injuriously attacked by the alkali.

I have found that cellulose ethers of sufficient quality for certain purposes, such as the manufacture of electrical insulating coatings, can be made by adding all the ingredients substantially separately to the reaction space and then agitating and heating the reaction mass until the reaction reaches a satisfactory stage. By substantially separately I mean that the very intimate preadmixture of alkali and cellulose has been eliminated. Of course, the ingredients may be roughly mixed together before adding to the autoclave, if desired, such crude admixture being obviously different from the very intimate mixing hitherto considered necessary. I prefer to add the ingredients entirely separately to the reaction vessel.

For example, I may charge into an autoclave separately 100 parts of cotton, 250 parts of water, 200 parts of solid caustic soda and 400 parts of ethyl chloride. The ingredients are then stirred together or agitated at temperatures from 90 to 170° C., until the desired etherification takes place,— say twenty-four hours, for instance.

Having thus described my invention, what I claim as new and desire to secure by Letters Patent is:

1. The process of making ethers of cellulose, which comprises the steps of substantially separately adding into a reaction space only the amounts of cellulose, solid alkali, water and etherifying agent for the reaction, and, without intimate mixing or ripening, agitating and heating the resulting reaction mass.

2. The process of making ethyl ethers of cellulose, which comprises the steps of substantially separately adding into a reaction space only the amounts of cellulose, solid caustic soda, water and ethyl chloride for the reaction, and, without intimate mixing or ripening, agitating and heating the resulting reaction mass.

3. The process of making ethers of cellulose, which comprises the steps of substantially separately adding into a reaction space only the amounts of cellulose, solid alkali, water and etherifying agent for the reaction, the water not exceeding the alkali by more than approximately 25%, and agitating and heating the resulting reaction mass.

Signed at Rochester, New York, this 26th day of March 1921.

PAUL C. SEEL.